(12) United States Patent
Gettys et al.

(10) Patent No.: US 7,895,075 B2
(45) Date of Patent: Feb. 22, 2011

(54) METHOD AND APPARATUS FOR DETERMINING AN EFFECTIVE MEDIA CHANNEL TO USE FOR ADVERTISEMENT

(75) Inventors: David Gettys, Hunstville, OH (US); William Gilbert, Worthington, OH (US)

(73) Assignee: Cable Television Advertising Group LLC, Huntsville, OH (US)

( * ) Notice: Subject to any disclaimer, the term of this patent is extended or adjusted under 35 U.S.C. 154(b) by 1280 days.

(21) Appl. No.: 11/201,330

(22) Filed: Aug. 11, 2005

(65) Prior Publication Data

US 2006/0036489 A1    Feb. 16, 2006

Related U.S. Application Data

(60) Provisional application No. 60/600,807, filed on Aug. 12, 2004.

(51) Int. Cl.
*G06Q 30/00* (2006.01)

(52) U.S. Cl. .................................................. 705/14.41
(58) Field of Classification Search ................... 705/14, 705/14.41
See application file for complete search history.

(56) References Cited

U.S. PATENT DOCUMENTS 6,937,996 B1 * 8/2005 Forsythe et al. ............... 705/16
2004/0193488 A1 * 9/2004 Khoo et al. ................... 705/14

OTHER PUBLICATIONS

Nielsen Watch Dec. 2-8, Broacasting & Cable, Dec. 16, 2002, ABI/Inform Global p. 18.*

* cited by examiner

*Primary Examiner*—John G Weiss
*Assistant Examiner*—Matthew L Hamilton
(74) *Attorney, Agent, or Firm*—Baker & Hostetler LLP

(57) ABSTRACT

A method and apparatus for determining the effective of advertising resource in a particular media channel such that one can determine where best to advertise their individual products for their business.

24 Claims, 2 Drawing Sheets cable television advertising group, LLC

CableMAP Report
QUALITATIVE TARGET VALUE
TOP 5 NETWORKS
XXX Cable Company 58 { Your Company
Your Agency
Adults 18+
Make of last vehicle acquired: Chevrolet
Type of last vehicle acquired: SUV

| NETWORKS | SOURCE: QUALITATIVE ||| CST Jul 04 - M-Sun 6p-12m ||| CALCULATIONS ||||
|---|---|---|---|---|---|---|---|---|---|---|
| Ranked by QTV | Cump Reach | Index to Market | QTV | Spot Rate | Nielsen Rating | Households by Demo Universe (000) | Delivered Impressions (000) | Traditional CPM | QTV CPM | Cume Reach CPM |
| History Channel | 26.8% | 120 | 32.2 | $45.00 | 0.7 | 286.3 | 2.0041 | $22.45 | $69.82 | $83.78 |
| MTV | 14.6% | 147 | 21.5 | $60.00 | 0.8 | 286.3 | 2.2904 | $26.20 | $122.06 | $179.43 |
| Discovery Channel | 32.2% | 111 | 35.7 | $119.00 | 0.9 | 286.3 | 2.5767 | $46.18 | $129.21 | $143.43 |
| Lifetime | 18.5% | 105 | 19.4 | $149.00 | 1.6 | 286.3 | 4.5808 | $32.53 | $167.45 | $175.82 |
| Spike TV | 12.2% | 104 | 12.7 | $45.00 | 0.7 | 286.3 | 2.0041 | $22.45 | $176.97 | $184.05 |

Column reference numbers: 56, 34, 36, 38, 40, 42, 44, 46, 48, 52, 62; 60

METHOD AND APPARATUS FOR DETERMINING AN EFFECTIVE MEDIA CHANNEL TO USE FOR ADVERTISEMENT

CROSS-REFERENCE TO RELATED APPLICATIONS

This application claims priority to and is a provisional of U.S. patent application entitled, METHOD AND APPARATUS FOR DETERMINING AN EFFECTIVE MEDIA NETWORK TO USE FOR PLANNING AND SELECTION OF MEDIA, filed Aug. 12, 2004, having a Ser. No. 60/600,807, the disclosure of which is hereby incorporated by reference in its entirety.

FIELD OF THE INVENTION

The present invention relates generally to advertising. More particularly, the present invention relates to determining how a company or business can be effective in using their advertisement budget to reach a high percentage of the target audience.

BACKGROUND OF THE INVENTION

A great deal of monetary resources are used by business as to promote or sell their products. These monetary resources are used to buy advertisement space or time in specific media channels in the hopes that the advertisement is seen or heard by its intended audience. Each media channel though attracts a varying degree of individuals. For example, if a motorcycle manufacturer wanted to advertise its products, motorcycles, it would have to determine which media channel to use to advertise its products. One methodology would be to use the advertisement resources on the most popular media channels in the hopes that is absorbed by its intended buyer. Another methodology is to target the advertisement resources to media channels where the intended buyers are most likely to absorb or be exposed to the information. In order to do this, the motorcycle manufacturer would need to know some information about its buyers. The latter methodology is more advantageous, especially for those businesses that have a limited advertisement budget.

There is one type of media channel, television, where there is an enormous amount of advertisement resources expended. With the advent of television and the limited number of networks or stations available to the viewer, a majority, if not all the television advertisement resources, were expended on these stations. With the advent of cable television, the possible number of stations available to the viewers can be in the hundreds. Theoretically, the advertisement resources should now be distributed among all these stations. However, this has not been the case. One reason is the lack of good statistical analysis on viewership.

Television media, similar to radio, offers unique challenges for advertisers. One of these challenges is that the advertisement, in order to be most effective, needs to be targeted to its intended audience. Therefore, an analysis would need to be done in order to determine when the intended audience is most likely to view the advertisements and then run the advertisements at that selected period.

The Nielson Ratings collects viewer data and makes its available to advertisers as a tool to help target their intended audience. Nielsen uses people meters to collect minute by minute household and person's data 365 days per year. These meters provide comprehensive information about who is watching and what they are watching.

The people meters are most effective in that they track what each person in a household is watching. For example, in a house of a mother, father, a son and a daughter, each individual is tracked by the people meter by each person "logging into" the meter and alerting the meter that a specific person is now watching the television program.

In Nielsen markets where there are meters, a box is placed on the outside of the house and the viewing habits of the residents are captured. The residents are supposed to fill out a diary and send the information to Nielsen. However, in reality, the diaries are being returned are incomplete and/or lacking vital information. There are large gaps in the data collected from Nielsen as to who is watching the television programming especially if there are multiple viewing residents in the house.

Even though there is a discontinuity in the data, the traditional model of advertising spending on the major networks has substantially stayed the same. Furthermore, the data does not accurately take into account the explosive growth of cable television. Therefore, there is a need for an effective way for advertisers and/or businesses to determine how most effectively to use their advertising budget in order to reach their intended audience. Accordingly, it is desirable to provide a method and apparatus that can provide these benefits.

SUMMARY OF THE INVENTION

The foregoing needs are met, to a great extent, by the present invention, wherein in one aspect an apparatus and method is provided that in some embodiments a qualitative target value, which is determined by combining a cumulative reach with an index to market. By combining these two pieces of data, a more accurate picture emerges as to where a business should expend its advertising resources.

In accordance with one embodiment of the present invention, computer readable medium containing executable code for determining an effective use of advertising resources includes determining a cumulative reach which is derived from a number of individuals who were exposed to a media channel for an hour or more for a previous week, determining a market index which is derived from how the percentage of respondents among a selected target group (universe) answering the question compares to the percentage of all respondents in the market answering the question and assigning a qualitative target value to a media channel, which is the two values multiplied together, so one can rank in order all the media channels.

This embodiment can further include determining the efficiency of the advertising resources expended on an advertisement based upon the qualitative target value by determining a cost of a thirty second advertisement on a media channel, determining the rating for the daypart or programming on that media channel, determining the number of households in a market and the demographic impressions that receive the media channel, arriving at cost per thousand impressions delivered. The cost per thousand impressions delivered is then divided by the QTV value to calculate a qualitative cost per thousand to reach a qualified audience, defined by the qualitative target.

In accordance with another embodiment of the present invention, a method for determining an effective use of advertising resources includes determining a cumulative reach which is derived from a number of individuals who were exposed to a media channel for an hour or more for a previous week, determining a market index which is derived from how the percentage of respondents among a selected target group (universe) answering the question compares to the percentage of all respondents in the market answering the question and assigning a qualitative target value to the media channel, which is the two values multiplied together, so one can rank in order all the media channels.

This embodiment can further include determining the efficiency of the advertisement resources expended on an advertisement based upon the qualitative target value by determining a cost of a thirty second advertisement on the media channel, determining the rating for the daypart or programming on that media channel, determining the number of households in a market and the demographic impressions that receive the media channel, arriving at cost per thousand impressions delivered. The cost per thousand impressions delivered is then divided by the QTV value to calculate a qualitative cost per thousand to reach a qualified audience, defined by the qualitative target.

There has thus been outlined, rather broadly, certain embodiments of the invention in order that the detailed description herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
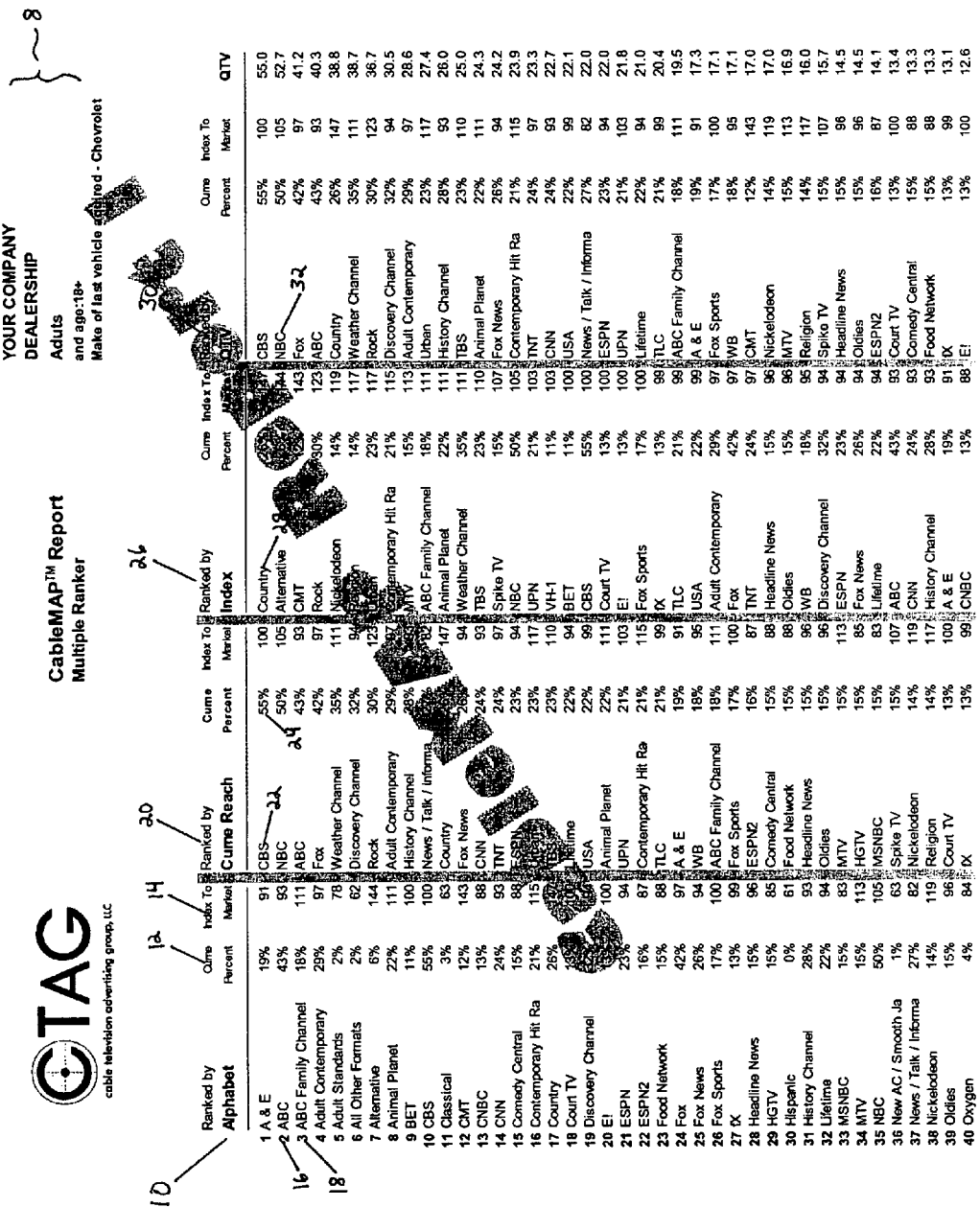
FIG. 1 is a chart that illustrates how the qualitative target value is determined according to a preferred embodiment of the invention.

The invention will now be described with reference to the drawing figures, in which like reference numerals refer to like parts throughout. An embodiment in accordance with the present invention provides an apparatus and method that enables a business or an individual to target advertising resources in a direction that is most beneficial to them. Without such a direction, valuable resources are likely to be expended in a direction that will bring in the least amount of return. The present invention enables the advertising resources to be focused in an area such that it brings in the most return for the dollars spent.

In summary, the present invention is defined as a data-integration process where data research that depicts consumer behavior, is cross tabbed to media selectivity and usage and then Modeled to a Designated Market Area (DMA) using Nielsen National People Meter ratings, to report a more accurate measurement of demographic viewership on cable networks or any other media channels/networks.

FIG. 1 is a chart that illustrates how the qualitative target value is determined according to a preferred embodiment of the invention. The FIG. 1 contains data 8 associated with adults that are 18 and older, whose last vehicle was a Chevrolet. FIG. 1 contains four columns, which list a television network along with associated data. In the first column 8, there are forty television networks, which include both the major networks as well as the cable networks. In the first column 10, the television networks are listed alphabetically. Additionally, there are two columns of data associated with each television network. There is a cumulative reach column 12 and an index to market column 14.

This data associated with the cumulative reach column 12 and the index to market column 14 is obtained, in the preferred embodiment, from a national data company such as Griffin Media Research. Griffin Media Research provides customized, local market-specific research to the advertising sales organizations in the cable, television, broadcast television and radio industries. The data from Griffin Media Research is hereby incorporated by reference in its entirety.

The cumulative reach column 12 is defined as the number of unique individuals who watched or were listening to a media channel such as a cable network or radio station for an hour or more the previous week. The cumulative reach may be expressed as a percentage of persons in a given target group or as the number of persons in a target group that are watching the network. The Index to Market column 14 details, for any question, how the percentage of respondents among a selected target group (universe) answering the question compares to the percentage of all respondents in the market answering the question.

For example, the television network, ABC 16, listed in the first column 10 has a cumulative reach of forty-three percent and an Index to Market Value of 93. This means that forty-three percent of the viewers in the data sample viewed an hour or more of ABC 16 the previous week. Furthermore, the selected target group, 18 years or older and whose last acquired car was a Chevrolet respondent, are less likely to answer the questions than the whole group data group based upon the Index to Market Value.

Looking at another example, the ABC Family Channel 18 has a cumulative reach of eighteen percent and an Index to Market of 111. In terms of the cumulative reach, this means that eighteen percent of the viewers viewed an hour or more of ABC Family Channel 18 the previous week. The Index to Market number indicates that the respondents for the selected target group, 18 years or older and whose last acquired car was a Chevrolet, are eleven times more likely to answer the questions.

The second column 20 merely ranks the same data in the first column 10 in a different order. The data in the second column is ranked by the cumulative reach. For example, the television network CBS 22 has the highest ranked cumulative reach at fifty-five percent 24. Again this means that fifty-five percent of the viewers viewed an hour or more of CBS 20 in the previous week.

The third column 26 ranks the data in the first column 10 in a different order as well. The third column 25 ranks the data based upon the index. For example, Country 28 is listed at the top of the index chart with an index to market value of one hundred and forty-seven 30. This means that the Country viewer is forty-seven times more likely to respond than the respondents as a whole. In other words, the viewer is forty-seven times more likely to view Country 28 than not view Country 28.

The fourth column 30 ranks the data by the qualitative target value (QTV), which is obtained by combining the cumulative reach percent to the Index to Market. In other words, the QTV is ascertained or calculated by multiplying the cumulative reach percent by the Index to Market. For example, the QTV for the television network NBC 30 is fifty-two point seven, which is the second highest. The QTV value is a better indicator of the data 8, which is 18 years and older who's last vehicle acquired was a Chevrolet. By having the QTV value, the resources can be better directed as opposed just to just relying on the cumulative reach percent or the Index to Market. By combining the two data values to obtain a single value, a more effective analysis can be made as to the expense of resources.

Figure 2:
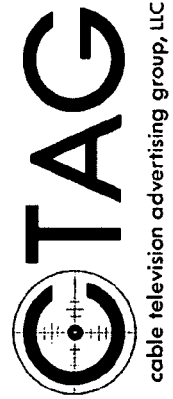
FIG. 2 is an additional chart that illustrates how the qualitative target value is used to determine the effectiveness of the advertising resources.
Figure 2:
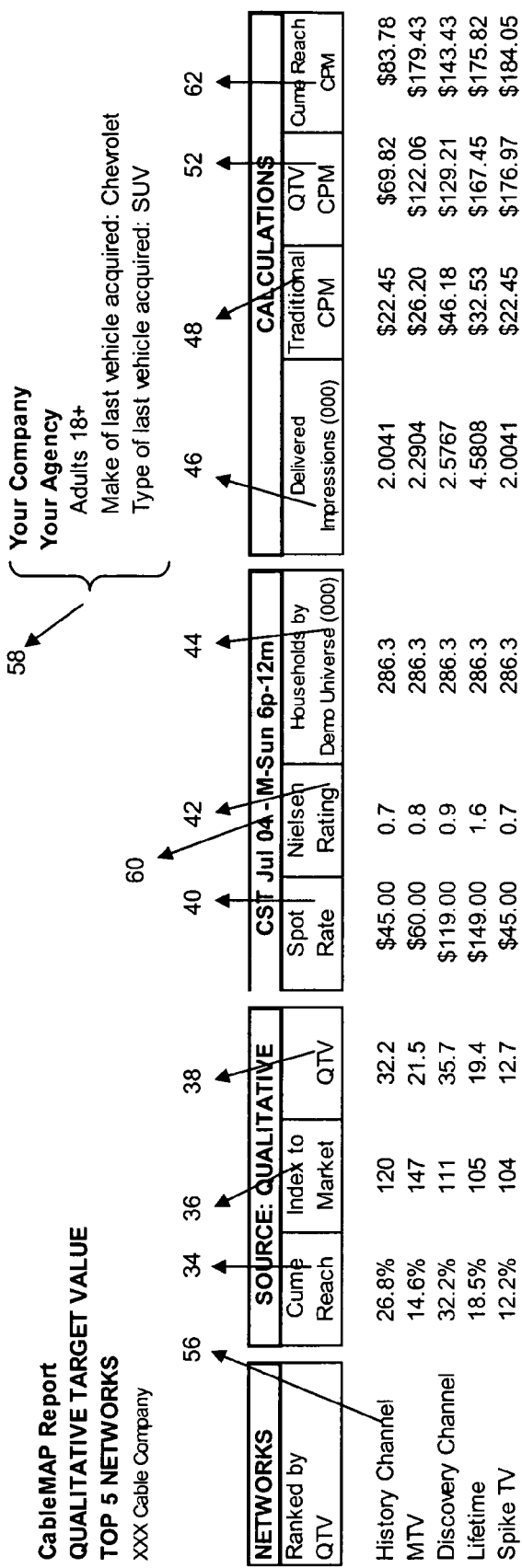

FIG. 2 is an additional chart that illustrates how the QTV is used to determine the effectiveness of the advertising resources. The chart is broken down as follows:

The cumulative reach percent column 34, similar to FIG. 1, is the number of unique individuals who watched a cable network for an hour or more the previous week. The cumulative reach may be expressed as a percentage of persons in a given target group or as the number of persons in a target group that are watching the network.

The Index to Market column 36 details, for any question, how the percentage of respondents among a selected target group (universe) answering the question compares to the percentage of all respondents in the market answering the question.

The QTV column 38 is determined by taking the cume percent column 34 and multiplying it by the Index to Market 36 of the network to see the overall QTV of a Target Demographic.

The spot rate column 40 is the dollar figure associated with a thirty second advertisement for that network.

The rating column 42 is the average quarter hour rating for a target demographic that the associated network delivers within the defined day/daypart/program for the requested demographic according to Nielsen National People Meter Research modeled to the selected designated market area (DMA) such as Dayton, Ohio. Note that this figure is merely using the Dayton, Ohio as a reference point to explain the current invention. The invention is not limited to any particular market.

The total number of households' column 44 in the market is the number of households that receive the media network represented.

The delivered number of impressions 46 is arrived at by multiplying the total universe estimate by the housedholds column 44 by the rating column 42. The information can be based upon information received from Nielsen Media Research.

The total cost per thousand (CPM) or traditional CPM column 48 is determined by dividing the delivered number of impressions column 46 into the spot rate column 40.

A cumulative reach CPM efficiency factor column 62 can be calculated by dividing the Traditional CPM column 48 by the cume reach percent column 34.

The QTV CPM column 52 is determined by dividing the QTV column 38 into the Traditional CPM column 48. This result is then multiplied by 100.

The following is a detailed example of the assessment of the History Channel television network 56. As stated, FIG. 2 provides a data set 58, which includes anyone eighteen years or older, whose last vehicle acquired was a Chevrolet SUV.

Additionally, the data set 58 is for the viewing time period, column 60, of Monday through Sunday six pm to midnight central standard time. The cumulative reach percent for the History Channel 56 is 26.8%, which means that this was the percentage of viewers that watched the History Channel 56 at least for one hour in the past week. The Index to Market for the History Channel 56 is 120, which means that people in the data set 58 were 20 percent more likely to respond or are History Channel 56 viewers. The next step is then to determine the QTV, which is determined by multiplying the cumulative reach percent (26.8%) by the Index to Market (120). The QTV for the History Channel then becomes 32.2.

The next three columns, the spot rate 40, the rating 42 and the Households By Demo Universe 44 are all data figures that are gathered from an external source and entered. The spot rate for the History Channel is $45.00. The rating is 0.7 and the Households By Demo Universe 44 is 286.3 in thousands.

The delivered number of households' (impressions) column 46 is determined by the following equation:

(Rating×Delivered number of households)/100 which for the current data set is (0.7×286.3)/100. This equates to 2.0041.

The total or traditional CPM for the History Channel 56 is determined by the following equation:

Spot Rating/Delivered number of households(impressions)which for the current data set 58 is($45.00/2.0041). This equates to $22.45

A cumulative reach CPM can also be calculated and is determined by the following equation:

Traditional CPM Column 48/(Reach Column 34 which is($22.45/26.8%). This equates to $83.78.

The QTV (CPM) is determined by the following equation:

Traditional CPM Column 48/(QTV(Column 38)×100 which for the current data set 58 is($22.45/32.2)×100. This equates to $69.73.

Advertising agencies and major clients are looking at engagement as a way to measure the efficiency of their media campaigns. They are looking for a way to measure not just how many people are watching but how they interact with the client's advertising and who they are. Qualitative research will provide these answers along with a cross tab against media usage. The QTV calculation allows one to take qualitative research an additional step by providing a indices against the actual cost of the media they are scheduling. The QTV CPM defined in previously provides the true cost per thousand for a media channel to deliver a qualified viewer.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A non-transitory computer readable medium including a set of instructions, for execution by a computer, comprising:

instructions for processing customized, market-specific consumer data to determine a cumulative reach value, for each of a plurality of media channels, based on a number of individuals exposed to each of said plurality of media channels for an hour or more for a previous week;

instructions for processing the data to determine an index to market value, for each of said plurality of media channels, that compares, as a ratio, a percentage of respondents from a selected target group that answered a question to a percentage of all respondents that answered the question;

instructions for calculating a qualitative target value, for each of said plurality of media channels, by multiplying the cumulative reach value and the index to market value; and instructions for calculating a qualitative target value cost, for each of said plurality of media channels, based upon the qualitative target value, wherein lowest qualitative target value cost identifies the media channel upon which advertising resources are most effective.

2. The computer readable medium of claim 1, wherein the set of instructions further comprises instructions for ranking the plurality of media channels based upon the qualitative target value.

3. The computer readable medium of claim 1, wherein the set of instructions further comprises instructions for selecting the media channel with the lowest qualitative target value cost to use to advertise.

4. The computer readable medium of claim 1, wherein the media channel is a television network.

5. The computer readable medium of claim 1, wherein the media channel is a radio station.

6. The computer readable medium of claim 1, wherein said calculating the qualitative target value cost for each of said plurality of media channels comprises:

determining a spot rate;

determining a target demographic rating;

determining a number of households in a market that receive the media channel;

calculating a delivered number of impressions by multiplying the number of households and the rating;

calculating a total cost by dividing the spot rate by the delivered number of impressions; and calculating the qualitative target value cost by dividing the total cost by the qualitative target value and multiplying by a factor of 100.

7. The computer readable medium of claim 6, wherein the set of instructions further comprises instructions for calculating a cumulative reach efficiency factor, for each of said plurality of media channels, by dividing the total cost by the cumulative reach value.

8. The computer readable medium of claim 6, wherein the target demographic rating is an average quarter hour rating expressed as a percentage.

9. A computer, comprising:

processor configured to:

receive customized, market-specific consumer data, process the data to determine a cumulative reach value, for each of a plurality of media channels, based on a number of individuals exposed to each of said plurality of media channels for an hour or more for a previous week, process the data to determine an index to market value, for each of said plurality of media channels, that compares, as a ratio, a percentage of respondents from a selected target group that answered a question to a percentage of all respondents that answered the question, calculate a qualitative target value, for each of said plurality of media channels, by multiplying the cumulative reach value and the index to market value, and calculate a qualitative target value cost, for each of said plurality of media channels, based upon the qualitative target value, wherein lowest qualitative target value cost identifies the media channel upon which advertising resources are most effective.

10. The computer of claim 9, wherein the processor is further configured to rank the plurality of media channels based upon the qualitative target value.

11. The computer of claim 9, wherein the processor is further configured to select the media channel with the lowest qualitative target value cost to use to advertise.

12. The computer of claim 9, wherein the media channel is a television network.

13. The computer of claim 9, wherein the media channel is a radio station.

14. The computer of claim 9, wherein said calculate the qualitative target value cost for each of said plurality of media channels comprises:

determine a spot rate;

determine a target demographic rating;

determine a number of households in a market that receive the media channel;

calculate a delivered number of impressions by multiplying the number of households and the rating;

calculate a total cost by dividing the spot rate by the delivered number of impressions; and calculate the qualitative target value cost by dividing the total cost by the qualitative target value and multiplying by a factor of 100.

15. The computer of claim 14, wherein the processor is further configured to calculate a cumulative reach efficiency factor, for each of said plurality of media channels, by dividing the total cost by the cumulative reach value.

16. The computer of claim 14, wherein the target demographic rating is an average quarter hour rating expressed as a percentage.

17. A method for determining an effective use of advertising resources, comprising:

receiving, by a processor, customized, market-specific consumer data;

processing, by the processor, the data to determine a cumulative reach value, for each of a plurality of media channels, based on a number of individuals exposed to each of said plurality of media channels for an hour or more for a previous week;

processing, by the processor, the data to determine an index to market value, for each of said plurality of media channels, that compares, as a ratio, a percentage of respondents from a selected target group that answered a question to a percentage of all respondents that answered the question;

calculating, by the processor, a qualitative target value, for each of said plurality of media channels, by multiplying the cumulative reach value and the index to market value; and calculating, by the processor, a qualitative target value cost, for each of said plurality of media channels, based upon the qualitative target value, wherein lowest qualitative target value cost identifies the media channel upon which advertising resources are most effective.

18. The method of claim 17, further comprising ranking the plurality of media channels based upon the qualitative target value.

19. The method of claim 17, further comprising selecting the media channel with the lowest qualitative target value cost to use to advertise.

20. The method of claim 17, wherein the media channel is a television network.

21. The method of claim 17, wherein the media channel is a radio station.

22. The method of claim 17, wherein said calculating the qualitative target value cost for each of said plurality of media channels comprises:
- determining a spot rate;
- determining a target demographic rating;
- determining a number of households in a market that receive the media channel;
- calculating a delivered number of impressions by multiplying the number of households and the rating;
- calculating a total cost by dividing the spot rate by the delivered number of impressions; and
- calculating the qualitative target value cost by dividing the total cost by the qualitative target value and multiplying by a factor of 100.

23. The method of claim 22, further comprising calculating a cumulative reach efficiency factor, for each of said plurality of media channels, by dividing the total cost by the cumulative reach value.

24. The method of claim 22, wherein the target demographic rating is an average quarter hour rating expressed as a percentage.

* * * * *